G. N. VAN SWERINGEN.
BRAKE BEAM HANGER LOCKING KEY.
APPLICATION FILED APR. 9, 1918.
1,277,157.
Patented Aug. 27, 1918.
2 SHEETS—SHEET 1.
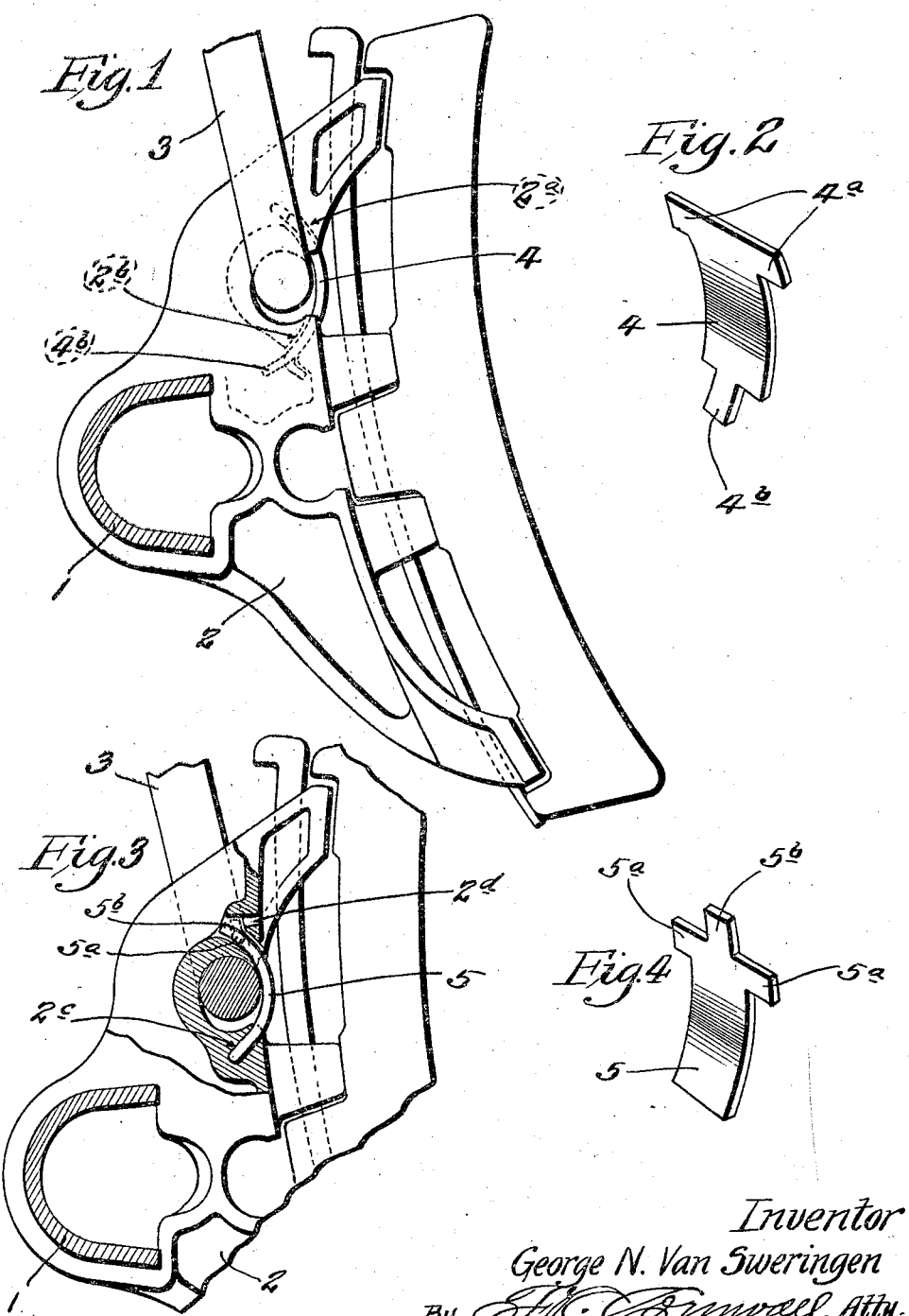
Inventor
George N. Van Sweringen G. N. VAN SWERINGEN.
BRAKE BEAM HANGER LOCKING KEY.
APPLICATION FILED APR. 9, 1918.
1,277,157.
Patented Aug. 27, 1918.
2 SHEETS—SHEET 2.
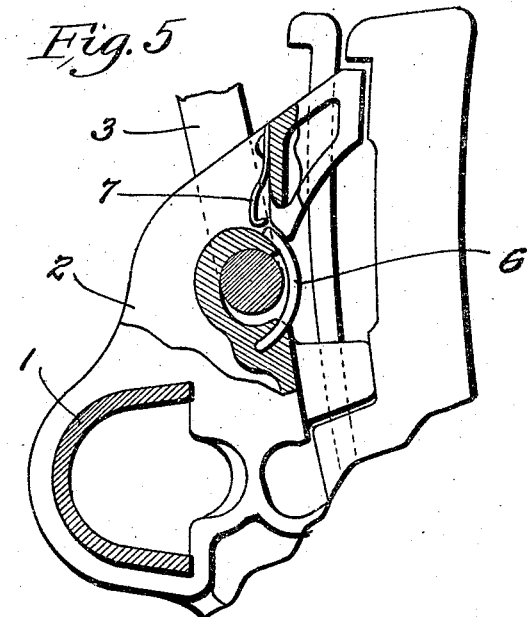
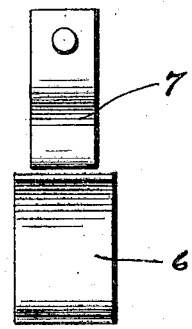
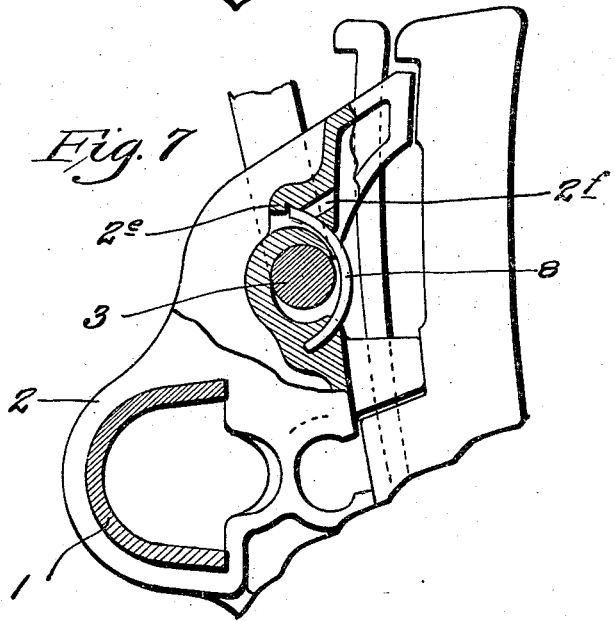
Inventor
George N. Van Sweringen

UNITED STATES PATENT OFFICE.

GEORGE N. VAN SWERINGEN, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM-HANGER-LOCKING KEY.

1,277,157.   Specification of Letters Patent.   Patented Aug. 27, 1918.

Application filed April 9, 1918. Serial No. 227,494.

*To all whom it may concern:*

Be it known that I, GEORGE N. VAN SWERINGEN, a citizen of the United States, residing at the city of Chicago, county of Cook, State of Illinois, have invented a certain new and useful Improvement in Brake-Beam-Hanger-Locking Keys, of which the following is a full, clear, and exact description, such as will enable others skilled in the art to which it appertains to make and use the same, reference being had to the accompanying drawings, forming part of this specification, in which—

Figure 1 is a side elevational view of a brake head provided with one form of my improved hanger locking key.

Fig. 2 is a detail view of said locking key.

Fig. 3 is a side elevational view partly in vertical section of another form of my improved hanger locking key.

Fig. 4 is a detail view of the locking key shown in Fig. 3.

Fig. 5 is a vertical sectional view through a portion of the brake head showing another form of my improved hanger locking key.

Fig. 6 is a detail view of a retaining spring and form of locking key shown in Fig. 5.

Fig. 7 is a detail view in vertical section of another form of my improved hanger locking key.

This invention relates to a new and useful improvement in hanger locking keys for brake beams, the object being to construct a device which is cheap and simple, which is easily applied in position and readily removable, the purpose of said key being to retain the brake beam hanger in the slot in the head in case a brake shoe is lost. In service, loss of a brake shoe means the loss of the wedge key which secures the shoe in position on the head, and which wedge key ordinarily serves as a front wall to retain the hanger in position in its receiving recess in the brake head; hence, if the shoe is lost and the wedge key likewise lost (the loss of which wedge key is usually a condition precedent to the loss of the shoe), there is nothing to retain the hanger in the head, or rather the head on the hanger, and consequently, in the absence of other supporting devices, a brake beam may become disconnected from its hanger at one end, where the shoe is lost, and permit the beam to drop. The dropping of the beam might lead to derailment resulting in serious damage with possible injuries to person or loss of life.

In the drawings, 1 indicates a brake beam member on which is supported the brake head 2, this brake head being of a well known construction, except that in the top and bottom walls forming the recess for receiving the hanger 3 there are provided openings $2^a$ and $2^b$, these openings being preferably curved in this particular form of my invention as shown. 4 indicates a hanger locking key which, after the hanger is seated in its recess, is inserted into the upper opening $2^a$ until the shoulders $4^a$ come in contact with the edges of said openings, at which time the tongue $4^b$ of the hanger protrudes below the opening $2^b$ and may be bent, as indicated in dotted lines, to prevet the accidental displacement of the hanger locking key. The hanger locking key 4, just above referred to, is preferably curved before being inserted in position, and when it is desired to withdraw this hanger locking key from its position, a suitable instrument may be employed to straighten out the bent tongue whereby a prying instrument may be arranged under the shoulder or shoulders, using the walls of the hanger recess as a fulcrum to lift the key out of its seat.

In Figs. 3 and 4, I have shown another form of my invention in which there is a blind recess or seat $2^c$ in the lower wall of the hanger seat, and the key 5 in this form, while having shoulders $5^a$, has its tongue $5^b$ arranged at its upper end so that said tongue may be bent under the overhanging wall of the key seat, as shown by dotted lines in Fig. 3. An opening $2^d$ is formed in the front wall of the brake head in alinement with this tongue $5^b$, and in order to withdraw the key, an instrument may be inserted through this opening and the tongue straightened out.

In Figs. 5 and 6, I have shown another form of my invention in which the key 6 is not provided with shoulders or a locking tongue, but in their stead a separate spring member 7 is secured to the brake head so that when the key 6 is in position, this spring will have its lower end located over the upper end of the key and prevent its accidental displacement. The front wall of the brake head is recessed in line with the lower bent portion of the spring so that said spring may be pressed inwardly by a suitable instrument out of the path of the key when it is desired to lift the latter out of its seat.

In Fig. 7, I have shown another form of my invention in which the upper keyway is provided with a shoulder $2^e$, and when the key 8 is formed, instead of being curved on the same radius throughout its length, it is curved on a larger radius at its upper end, or said upper end may be straight for a short distance so that when the key 8 is inserted in position, when driven home, its upper end will spring upwardly behind the shoulder $2^e$, thereby locking the key against accidental displacement. A hole $2^f$ is formed in the front wall of the brake head through which an instrument may be introduced to disengage the upper end of the key from the shoulder $2^e$, thereby permitting the removal of the key.

What I claim is:

1. In a brake hanger locking key for brake beams, the combination of a brake head having a seat formed therein for the brake hanger, the walls of said brake hanger seat being formed with openings or recesses for the reception of a brake hanger locking key, a brake hanger locking key introduced into said walls or recesses and so arranged as to constitute a front wall of said brake hanger seat, and a yielding locking device for holding said key in position against accidental displacement.

2. In a brake hanger locking key for brake beams, the combination of a brake head having a seat formed therein for the brake hanger, shoulders on the brake head adjacent to the walls of said seat for coöperating with the locking key, a locking key which passes through an opening in at least one wall of said hanger seat, and yielding means on said locking key for engaging the shoulder or shoulders on the brake head for preventing accidental displacement of said key.

In testimony whereof I hereunto affix my signature in the presence of two witnesses, this first day of April, 1918.

G. N. VAN SWERINGEN.

Witnesses:
C. HAINES WILLIAMS,
H. F. FURNER.

Copies of this patent may be obtained for five cents each, by addressing the "Commissioner of Patents, Washington, D. C."